US006175776B1

(12) United States Patent
Kuchta et al.

(10) Patent No.: US 6,175,776 B1
(45) Date of Patent: Jan. 16, 2001

(54) SIDE AND EDGE SEAL FOR MINIMIZING VACUUM LOSSES FROM A PERMEABLE SUPPORT SURFACE

(75) Inventors: Richard Kuchta, Shickshinny, PA (US); Alexander Zusmanovich; Joseph Vivirito, both of South Windsor, CT (US)

(73) Assignee: Gerber Technology, Inc., Tolland, CT (US)

( * ) Notice: Under 35 U.S.C. 154(b), the term of this patent shall be extended for 0 days.

(21) Appl. No.: 09/116,031

(22) Filed: Jul. 15, 1998

(51) Int. Cl.[7] .................................................. G06F 17/30

(52) U.S. Cl. .......................... 700/117; 700/127; 700/134; 700/146; 269/21; 269/55; 451/288; 83/19; 83/409

(58) Field of Search .................................... 700/127, 128, 700/130, 131, 132, 133, 134, 137, 146; 269/21, 55, 315; 451/288; 294/64.1; 83/19, 409, 645

(56) References Cited

U.S. PATENT DOCUMENTS 4,672,870 * 6/1987 Levene et al. .......................... 83/19
5,189,936 * 3/1993 Gerber et al. .......................... 83/409
5,222,719 * 6/1993 Effner .................................... 269/21
5,249,785 * 10/1993 Nelson et al. ........................ 269/21

* cited by examiner

*Primary Examiner*—Thomas C. Lee
*Assistant Examiner*—Thuan Du
(74) *Attorney, Agent, or Firm*—McCormick, Paulding & Huber LLP

(57) ABSTRACT

In an apparatus for minimizing vacuum losses from a permeable support surface having one or more layers of sheet-type work material positioned thereon, the support surface includes opposed lateral edge surfaces, each defining an upper and lower section. At least two upper seals are coupled to the frame, each engaging the upper section of one of the lateral edge surfaces and extending approximately the length of the support surface. At least two side seals are also provided and are coupled to the frame, each engaging the side section of one of the lateral edge surfaces and also extending approximately the length of the support surface. During operation of the apparatus, vacuum is drawn through the permeable support surface and causes the upper and side seals to be drawn and held against the lateral side sections, forming a seal there against.

12 Claims, 2 Drawing Sheets

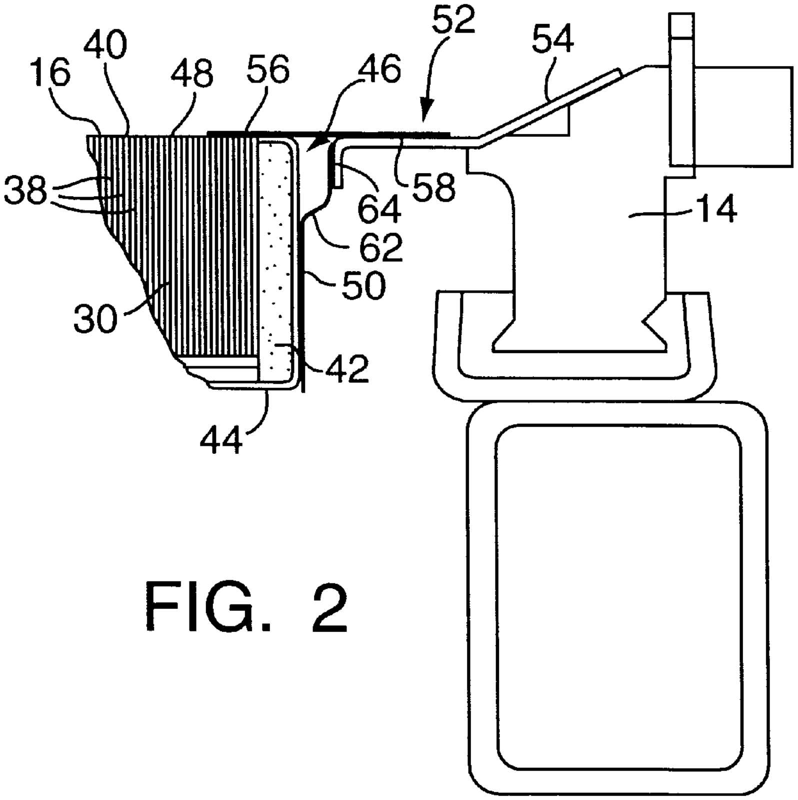
FIG. 2
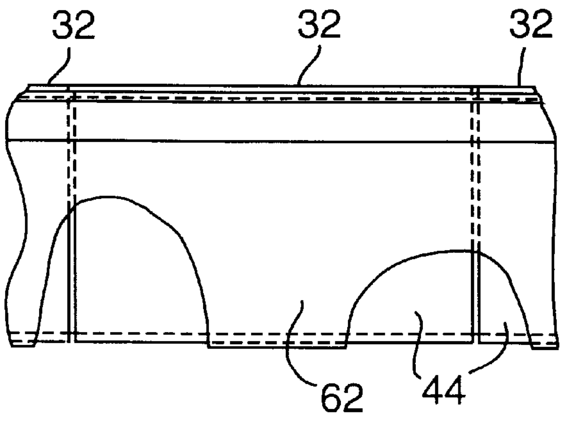
F"IG. 3

SIDE AND EDGE SEAL FOR MINIMIZING VACUUM LOSSES FROM A PERMEABLE SUPPORT SURFACE

FIELD OF THE INVENTION

The present invention relates generally to devices for performing work operations on one or more layers of sheet-type work material, and deals more particularly with an apparatus for sealing the sides and edges of a permeable support surface having one or more layers of work material positioned thereon and held in place using vacuum.

BACKGROUND OF THE INVENTION

Work operations are often performed on multiple layers of sheet-type work material, for example, in the mass production of garments, pattern pieces are usually cut from multiple layers of fabric spread one-on-top-of-the-other on a support surface. To facilitate clean accurate cuts, the layers of work material, often referred to as a lay, must be adequately held in place during the performance of a cutting operation. Failure to do so can result in movement of the fabric layers relative to one another, detrimentally affecting the performance of the cutting operation.

Generally, pattern pieces are cut from the lay using what is referred to as a cutter table. The support surface is mounted on the cutter table and is typically permeable, and often moveable relative to the table. The permeable support surface is in part comprised of a plurality of slats linked together and extending transversely of the frame.

A moveable cutter head traverses the support surface, cutting pattern pieces from the layers of material in response to commands issued from a controller. To eliminate any undesired movement of the layers of work material during the performance of the cutting operation, vacuum is sometimes used to draw and hold the work material against the support surface. A difficulty sometimes encountered with the above described cutter tables is that vacuum is often lost through the lateral edge sections of the support surface resulting in inadequate retention of the work material, detrimentally affecting the quality of the cut pattern pieces.

In an effort to seal the lateral edge sections of the support surface end blocks formed from a compressible, closed-cell material, such as foam, have been attached to the ends of the slats. However, over time the foam would suffer permanent deformation destroying the integrity of the seal.

Based on the foregoing, it is the general object of the present invention to provide an apparatus for retaining multiple layers of sheet material against a support surface that overcomes the drawbacks of prior art apparatus for sealing lateral edge sections of a permeable support surface.

It is a more specific object of the present invention to provide an apparatus to adequately seal the lateral edge sections of a conveyorized support surface.

SUMMARY OF THE INVENTION

The present invention is directed to an apparatus for retaining one or more layers of sheet-type work material on a support surface that is permeable and coupled to a frame. The permeable support surface has at least one pair of opposed lateral edge sections each defining an upper and side surface. Vacuum means are provided for drawing vacuum through the permeable support surface to retain the work material thereon, and to prevent any undesired movement of the work material relative to the support surface during the performance of a work operation.

The present invention also includes means for sealing the lateral edge sections of the support surface to prevent vacuum losses therethrough. Preferably these means include at least two side seals, each of which is coupled to the frame, and engages the side surface of one of the opposed lateral edge sections. In addition, at least two upper seals are also provided, each being coupled to the frame, and engaging the upper surface of one of the opposed lateral edge sections. During operation, the upper and side seals are drawn against the lateral edge sections of the support surface via the application of vacuum, thereby sealing the edge sections.

In the preferred embodiment of the present invention, the upper seals are formed from urethane film having a sufficiently low coefficient of friction such that movement of the work material positioned thereon is not hindered by the presence of the seal. While upper seals composed of urethane film have been described, the present invention is not limited in this regard as other materials can be substituted without departing from the broader aspects of the present invention.

Preferably the side seals are composed of poly film which will conform to the geometry of the side surfaces of the lateral edge sections when vacuum is applied. While side seals of poly film have been described, the present invention is not limited in this regard as other materials can be substituted without departing from the broader aspects of the invention.

BRIEF DESCRIPTION OF THE DRAWINGS

FIG. 2 is an enlarged partial view of the frame and support surface of the cutter table of FIG. 1 further illustrating the apparatus for sealing the lateral edge sections of the support surface.

FIG. 3 is an enlarged partial view of one of the lateral edge sections of the support surface of the cutter table of FIG. 1 showing one of the side seals engaging a side surface of one of the lateral edge sections.

DETAILED DESCRIPTION OF THE PREFERRED EMBODIMENT

Figure 1:
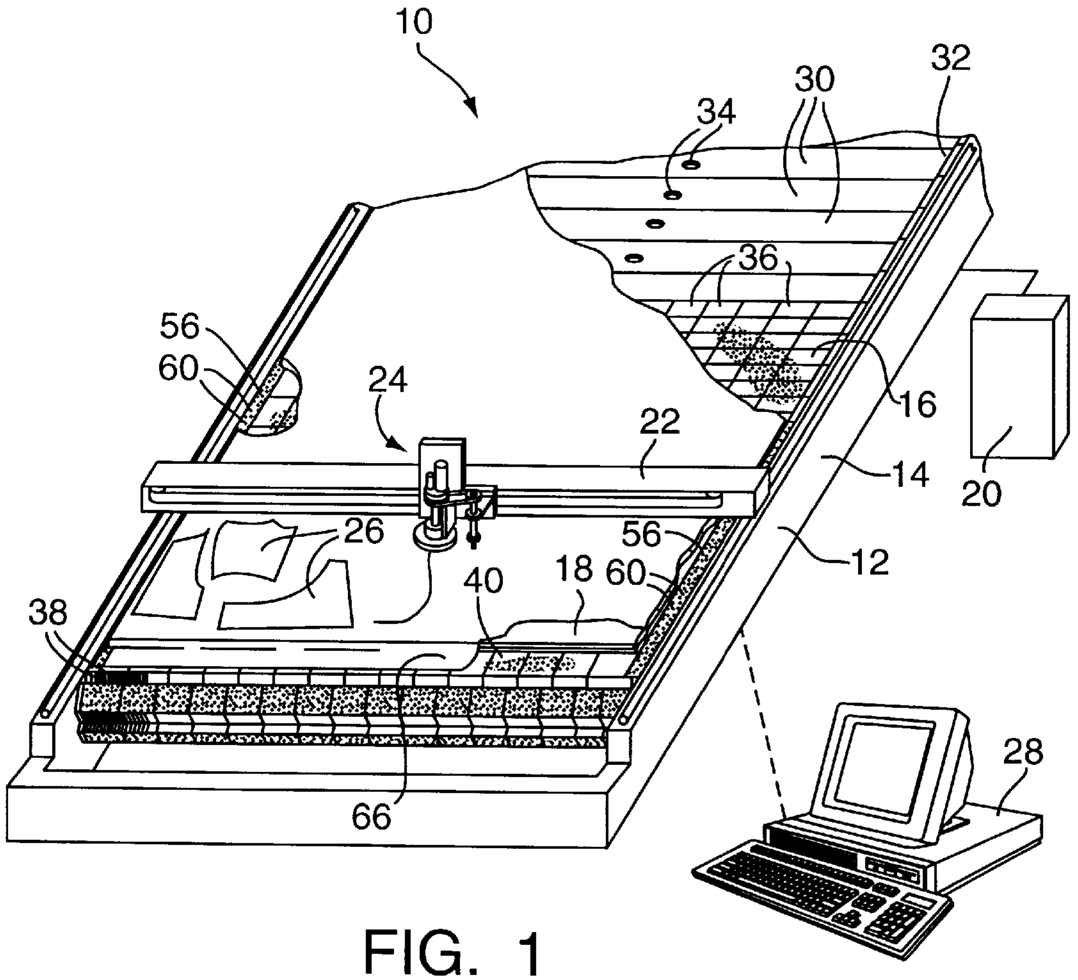
FIG. 1 is a partial perspective view of a cutter table embodying the present invention, showing a portion of the apparatus for sealing the upper portion of the lateral edge sections defined by the support surface.

A shown in FIG. 1, an apparatus for retaining one or more layers of sheet-type work material on a support surface is indicated generally by the reference numeral 10, and is shown in the illustrated embodiment as a cutter table 12. The cutter table 12 includes a frame 14 having a permeable support surface 16 mounted thereon for carrying one or more layers of sheet-type work material 18. A vacuum source 20, preferably a vacuum pump, supplies the vacuum for retaining the sheet-type work material 18 against the permeable support surface 16 during the performance of a work operation.

The cutter table 12 also includes a carriage 22 mounted on and extending laterally across the frame 14 for movement, back-and-forth in a direction longitudinal of the frame. A cutter head 24 adapted to carry a cutting implement such as, but not limited to, a blade (not shown), is mounted to the carriage 22 for movement longitudinally thereof and transversely of the frame 14. During the performance of a cutting operation, the cutter head 24 and carriage 22 move across the work material 18 cutting shaped pattern pieces 26 therefrom in response to commands issued from a controller 28 having machine readable cutting data stored therein.

Still referring to FIG. 1, the permeable support surface 16 is comprised in part by a plurality of slats 30 arranged in succession and linked together with each slat extending transversely across the frame 14. Each slat 30 has opposed ends 32 proximate to the frame 14 and defines at least one aperture 34 for drawing vacuum from the vacuum pump 20 through the support surface 16, and holding the work material 18 there against. The slats 30 are movable in a direction longitudinal of the frame 14 via the action of a suitable drive such as a motor (not shown). A plurality of bristle blocks 36 are mounted on each slat 30 with each bristle block being defined in part by a plurality of upwardly extending bristles 38 which in turn define a surface 40 upon which the work material 18 is supported.

As shown in FIG. 2, end blocks 42 are coupled to each end of each slat 30 and are formed from a suitable material such as, but not limited to, a resilient closed-cell polyethylene foam. The end blocks 42 are slightly wider than the slats 30 and abut one another to provide an initial seal to minimize vacuum losses between adjacent slats. An end cap 44 is positioned over each end block 42 and is coupled to the opposed ends 32 of each slat 30, thereby securing the end blocks to the slats.

Still referring to FIG. 2, the support surface 16 defines opposed lateral edge sections 46 that, in turn, each define an upper and side surface, 48 and 50 respectively. Each of the side surfaces 50 and the frame 14 coact to define a gap 52 therebetween that extends the length of the support surface 16. A seal support 54, attached to the frame 14, extends the length of the support surface 16, projecting away from the frame and extending part-way across the gap 52 adjacent to each longitudinally opposed lateral edge section 46. An elongated upper seal 56 is attached to each seal support 54, preferably via double-sided adhesive tape 58, and engages the upper surface 48, defined by each of the opposed lateral edges sections 46 of the support surface 16. However, while double-sided adhesive tape 58 has been described, the present invention is not limited in this regard as other adhesives, such as epoxies, can be substituted without departing from the broader aspects of the present invention.

Each upper seal 56 defines a plurality of apertures 60 extending therethrough to allow vacuum to be drawn through the support surface 16 and against the work material 18 positioned thereon. Preferably, upper seals 56 are composed of urethane film which has a sufficiently low coefficient of friction such that movement of the work material 18 positioned thereon is not hindered by the presence of the upper seal. While urethane film has been described, the present invention is not limited in this regard as other materials can be substituted without departing from the broader aspects of the present invention.

As shown in FIGS. 2 and 3, side seals 62 are attached to each seal support 54 and extend the length of the support surface 16. Each side seal 62 covers the end caps 44 and the portions of the end blocks 42 which extend between each slat 30, thereby forming a continuous seal along the side surface 50 of the lateral edge section 48. Preferably each side seal 62 is bonded to the seal support 54 with double-sided tape 64. However, the present invention is not limited in this regard as other adhesives, such as epoxies, can be substituted without departing from the broader aspects of the present invention.

It is preferable that the side seals 62 be composed of poly film which is sufficiently pliant and flexible so that the side seal will conform to the end cap 44 geometry when vacuum is applied. While side seals 62 composed of poly film have been described, the present invention is not limited in this regard as other materials, such as plastic films, natural, or synthetic elastomers, can be substituted without departing from the broader aspects of the present invention.

Referring to FIGS. 1–3, during operation, one or more layers of sheet-type work material 18 are moved onto the support surface 16 in response to commands issued by the controller 28. A layer of overlay material 66 preferably made from thin plastic film, is then positioned over the layer of work material 18. The vacuum pump 20 is activated, drawing vacuum though the apertures 34 in the slats 30 to retain the work material 18 against the permeable support surface 16.

As vacuum is applied, the side seals 62 are drawn against the end caps 44, thereby sealing the side surface 50 of the lateral edge section 46 of the support surface 16. Likewise, the upper seals 56 are drawn against and seal the upper surface 48 of the lateral edge section 46 of the support surface 16, and also allow vacuum be drawn through the aperture 60 to retain the work material against the support surface. The controller 28 issues commands to the apparatus coordinating the movement of the carriage 22, cutter head 24, and the support surface 16, thereby cutting shaped pattern pieces 26 from the work material 18. After the pattern pieces 26 have been cut from the work material 18, the vacuum is used to retain the pattern pieces against the support surface 16 until the work material is conveyed off of the support surface.

It should be understood that the foregoing description is only illustrative of the invention. Various alternatives and modifications can be devised by those skilled in the art without departing from the invention. Accordingly, the present invention encompasses a number of alternatives, modifications and variants that fall within the scope of the appended claims.

What is claimed is:

1. An apparatus for minimizing vacuum losses from a support surface having one or more layers of sheet-type work material positioned thereon, comprising:

a frame;

a permeable support surface coupled to said frame and defining at least one pair of opposed lateral edge sections;

each of said lateral edge sections defining an upper and side surface;

at least two upper seals, each coupled to said frame and engaging said upper surface of one of said opposed lateral edge sections;

at least two side seals, each coupled to said frame and engaging said side surface of one of said opposed lateral edge sections; and wherein said upper and side seals are drawn against said lateral edge sections of said support surface during application of vacuum by said vacuum means;

a controller in communication with said apparatus for storing data in machine readable format corresponding to a work operation to be performed on said work material; and means for drawing vacuum through said permeable support surface.

2. An apparatus for minimizing vacuum losses from a support surface having one or more layers of sheet-type work material positioned thereon as defined by claim 1, further comprising:

at least two seal supports each coupled to said frame, and extending adjacent to one of said lateral edge sections; and wherein said upper seals coupled to and project outwardly from said seal support for engaging said upper surface defined by each of said lateral edge sections.

3. An apparatus for minimizing vacuum losses from a support surface having one or more layers of sheet-type work material positioned thereon as defined by claim 1, wherein said upper seal defines a plurality of apertures adapted to allow vacuum to be drawn therethrough.

4. An apparatus for minimizing vacuum losses from a support surface having one or more layers of sheet-type work material positioned thereon as defined by claim 1, wherein:

said permeable support surface is defined by a plurality of slats arranged in succession and coupled together;

a plurality of bristle blocks coupled to each slat; and means for moving said plurality of slats in a direction longitudinal of said frame, during the performance of a work operation in response to commands issued from said controller.

5. An apparatus for minimizing vacuum losses from a support surface having one or more layers of sheet-type work material positioned thereon as defined by claim 4, further comprising:

each of said slats defining opposed ends proximate to said frame;

a plurality of resilient end blocks, one coupled to one of said opposed ends of each of said slats, said end blocks being wider than said slats such that adjacent end blocks abut one another forming a seal between successive slats; and a plurality of end caps positioned over said end blocks and coupled to said ends of said slats for retaining said end blocks.

6. An apparatus for minimizing vacuum losses from a support surface having one or more layers of sheet-type work material positioned thereon as defined by claim 1, wherein said means for drawing vacuum includes a vacuum pump.

7. An apparatus for minimizing vacuum losses from a support surface having one or more layers of sheet-type work material positioned thereon, as defined by claim 2, wherein:

one of said side seals is coupled to, and projects downwardly from each of said seal supports, engaging said side surface defined by each of said lateral edge sections.

8. An apparatus for minimizing vacuum losses from a support surface having one or more layers of sheet-type work material positioned thereon as defined by claim 7, wherein:

said side seals project downwardly from said frame and sealingly engage said end caps and said end blocks forming a continuous seal along the side surfaces defined by each of said lateral edge surfaces.

9. An apparatus for minimizing vacuum losses from a support surface having one or more layers of sheet-type work material positioned thereon as defined by claim 1 wherein said upper seals are formed from urethane film.

10. An apparatus for minimizing vacuum losses from a support surface having one or more layers of sheet-type work material positioned thereon as defined by claim 1 wherein said upper seals are formed from poly film.

11. An apparatus for minimizing vacuum losses from a support surface having one or more layers of sheet-type work material positioned thereon as defined by claim 2 wherein said upper seals are bonded to said seal supports by double-sided adhesive tape.

12. An apparatus for minimizing vacuum losses from a support surface having one or more layers of sheet-type work material positioned thereon as defined by claim 7 wherein said side seals are bonded to said seal supports by double-sided adhesive tape.

* * * * *